Aug. 24, 1926.
H. MASCHMEYER
1,596,985
HOG SCRAPING MACHINE
Filed Nov. 7, 1925 4 Sheets-Sheet 1
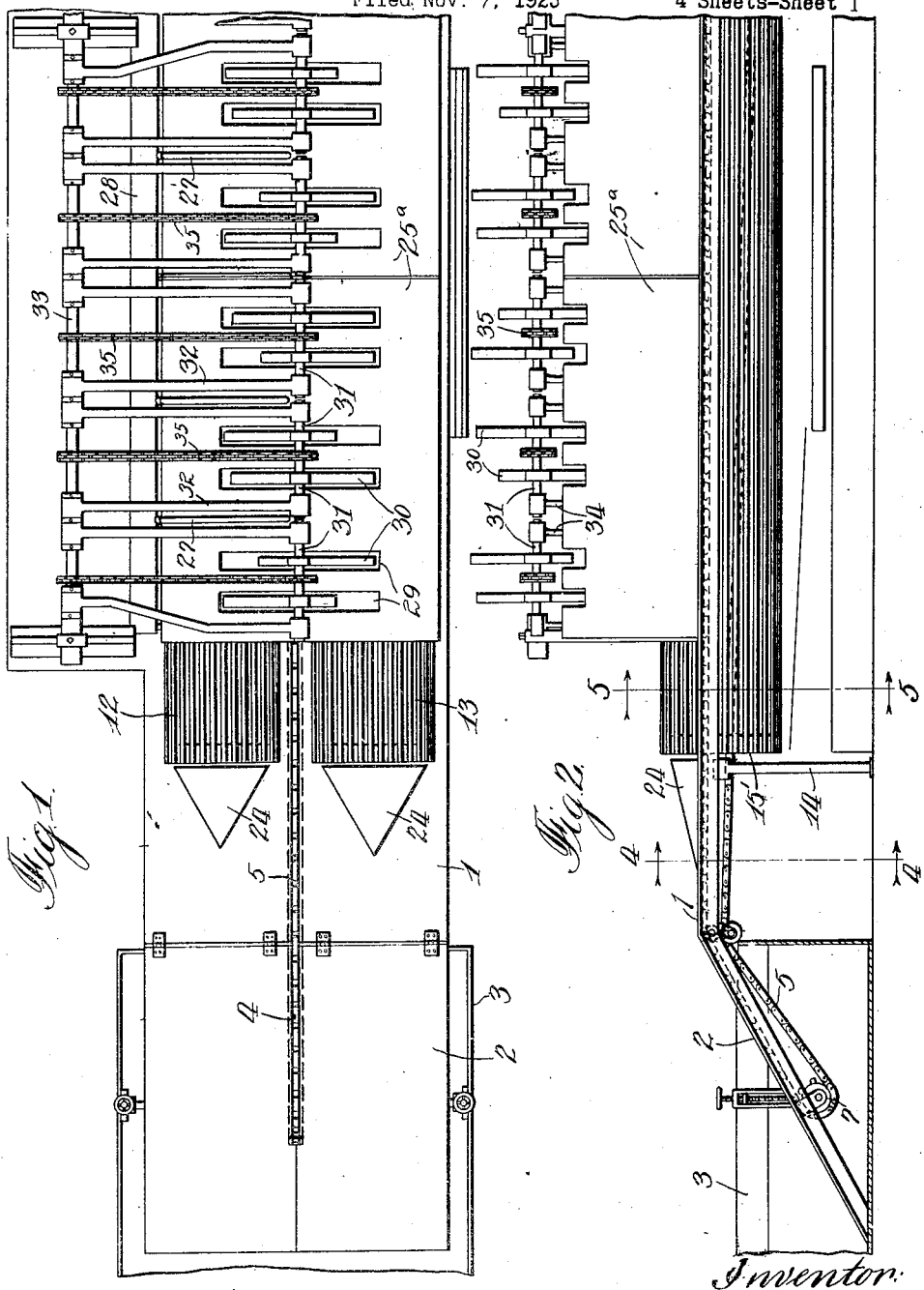
Inventor:
Herman Maschmeyer

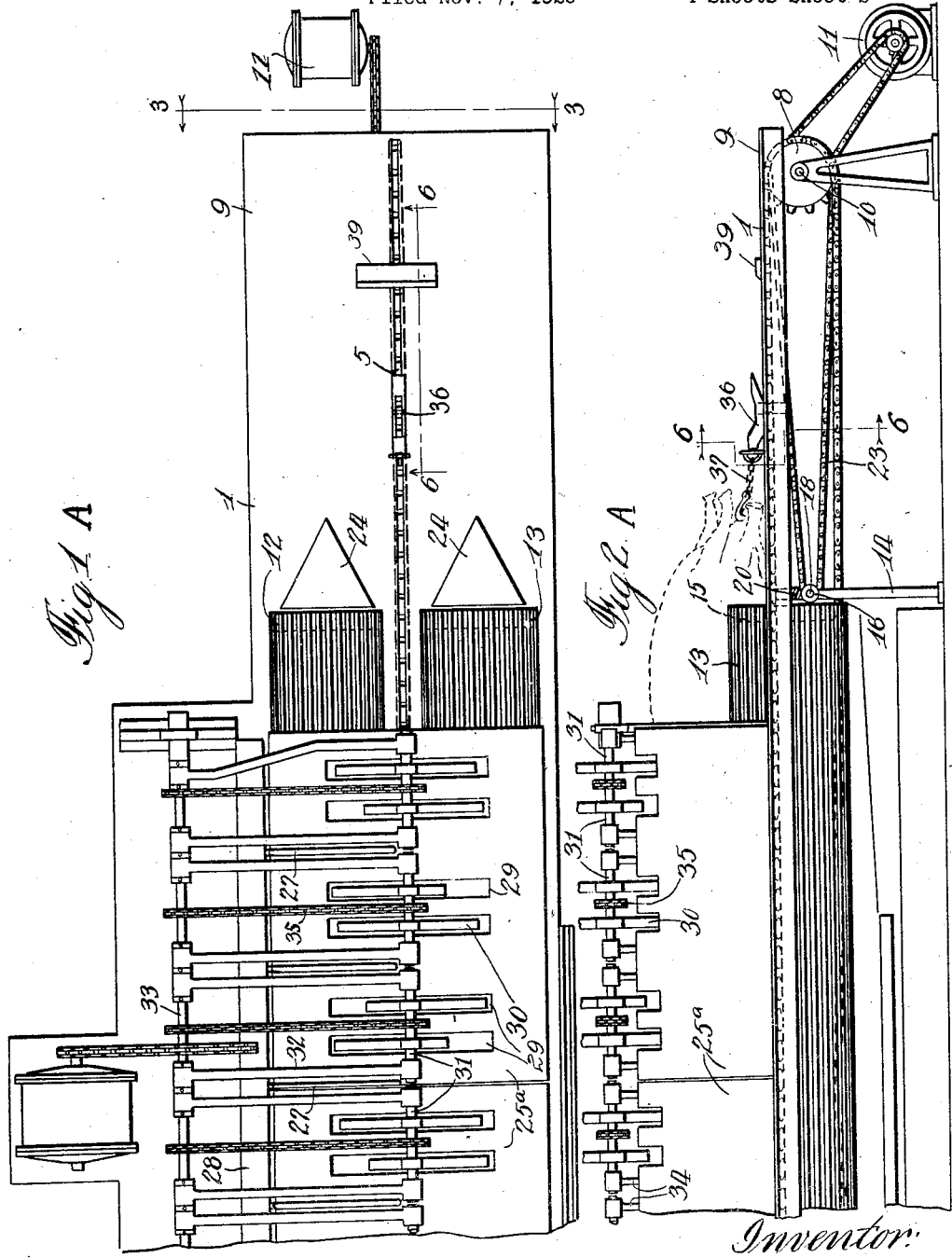

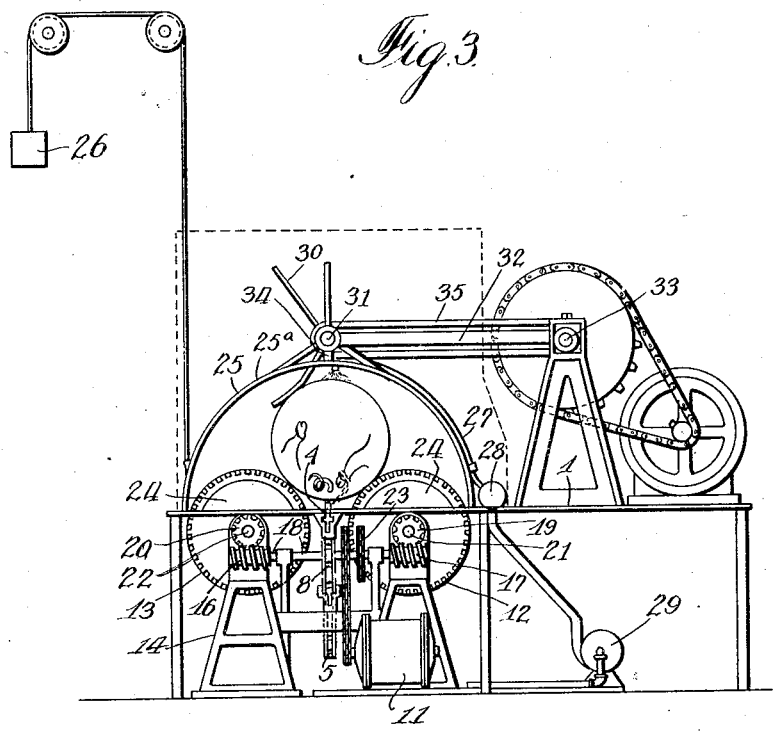
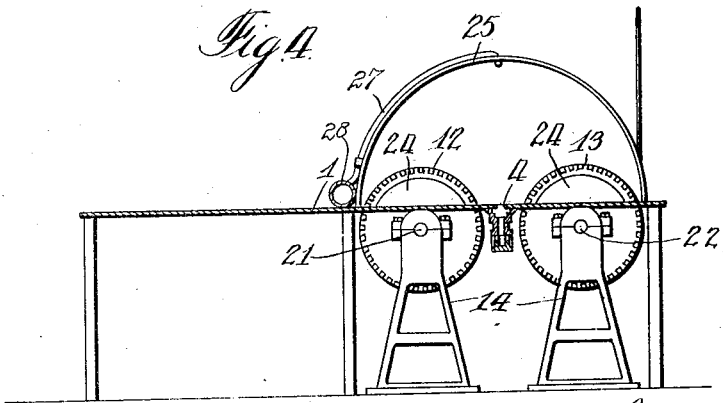

Aug. 24, 1926.
H. MASCHMEYER
HOG SCRAPING MACHINE
Filed Nov. 7, 1925
1,596,985
4 Sheets-Sheet 4
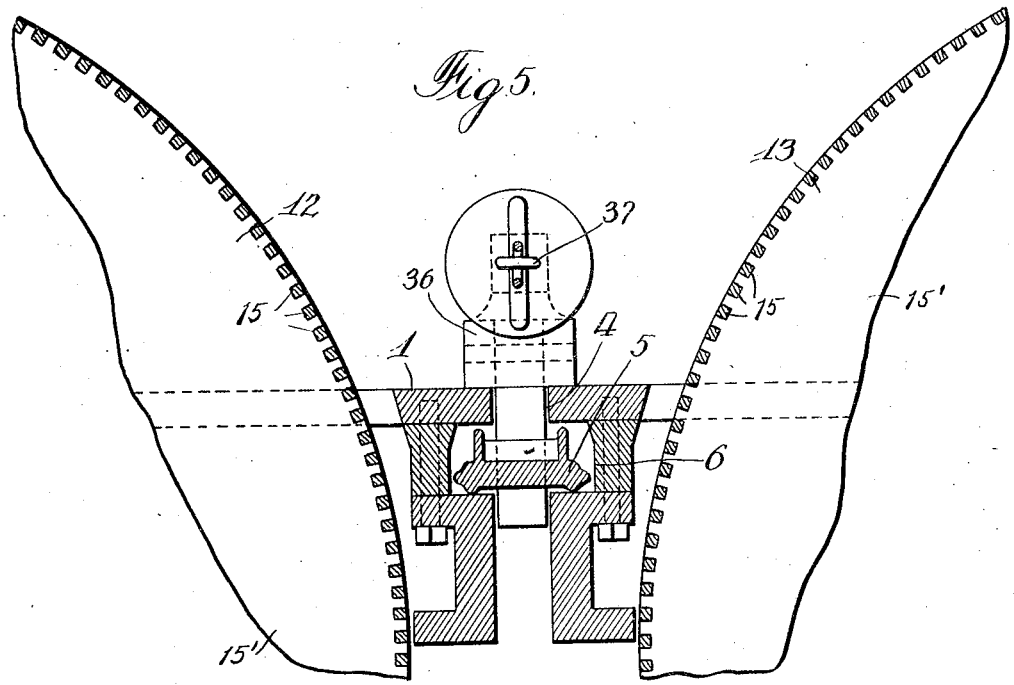
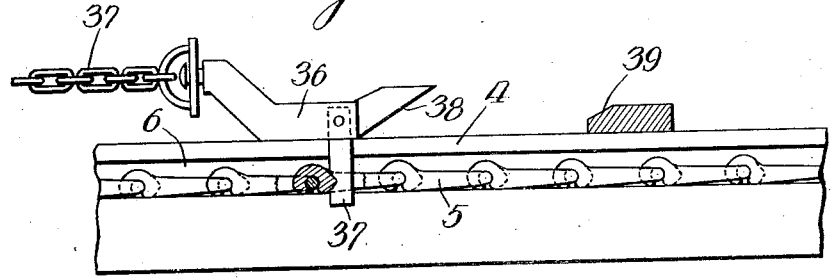
Witness:
Dav E S Magnusson
Inventor:
Herman Maschmeyer.
By Gummler & Gummler
Attys.

Patented Aug. 24, 1926.

1,596,985

UNITED STATES PATENT OFFICE.

HERMAN MASCHMEYER, OF WAUWATOSA, WISCONSIN, ASSIGNOR OF ONE-HALF TO SWIFT & COMPANY, OF CHICAGO, ILLINOIS, A CORPORATION OF ILLINOIS.

HOG-SCRAPING MACHINE.

Application filed November 7, 1925. Serial No. 67,562.

This invention relates to machines for removing hair from hogs, and differs mechanically from the machines now commonly employed for this purpose most characteristically in that the hogs are not suspended from a chain conveyer while passing between the scrapers, but are pulled through the machine between horizontally extending rollers which turn to slowly rotate the hogs while being acted upon by counter-weighted scrapers above the line of travel of the hogs. The purpose of this change in construction is mainly to avoid difficulties met with in the use of prior machines and increase the output and improve the quality of the work performed. Another object of the invention is to provide a machine which is self-adjusting for the purpose of uniformly acting upon hogs greatly varying in weight. It is also the purpose of the invention to provide an arrangement which will permit withdrawing a hog laterally from the machine at any time during the operation.

These objects are accomplished by the use of a construction such as illustrated in the drawings, wherein:—

Figures 1 and 1<sup>A</sup> are plan views of the machine.

Figs. 2 and 2<sup>A</sup> are side elevations.

Fig. 3 is an end elevation as seen from the right of Figure 2<sup>A</sup>.

Fig. 4 is a section on the line 4—4 of Fig. 2.

Fig. 5 is a section on the line 5—5 of Fig. 2.

Fig. 6 is a section on the line 6—6 of Fig. 1.

The preferred construction consists of a horizontally disposed platform which dips at one end into a vat from which the hogs are received by the machine and drawn along the platform by a chain conveyer passing along a guideway extending longitudinally through the center of the platform. The hogs are hooked to this chain by the use of the customary swiveled hooks so that the hogs may freely rotate as they pass through the machine. These hooks are now modified to include a beveled release member, which, at the end of the operation, engages a stationary member so as to be released from the chain. At each side of the chain conveyer is a long drum with its axis horizontal and parallel to the chain. These drums are preferably open, that is, of cage formation, having circular end pieces connected together by a series of bars or rods at the periphery of these end pieces.

Water which is sprayed on the hogs during the operation serves to carry the hair downwardly through the drums to conveyers which carry the hair laterally away from the machine. A curved guard extends over both of the drums from one side to the other of the machine and is pivoted at one side so that it may freely move upwardly to accommodate hogs of different sizes. Horizontal scraper shafts are located above the guard, and the flexible scraper members carried by these shafts rotate through transverse slots in the guard. The scraper shafts are carried by arms journaled at one side of the machine, in order that they may be swung upwardly with the guard or independently thereof.

This self-adjusting feature is not present in the machines now commonly in use for performing the same work and considerable time is lost, injury to the pork and non-uniformity of work results from the use of the older type of machine. Light hogs are not thoroughly scraped and heavy hogs are injured by the action of the scrapers, and sometimes with the old machines an unusually large hog jams the machine and it is necessary to stop its operation while the hog is removed with great difficulty. With the present construction, if there is any reason to remove the hog during the operation, this may be accomplished without difficulty since the scraper and guard may be swung out of the way.

As shown in the drawings, the horizontally disposed platform 1 slopes at one end 2, down into the scalding vat 3. The platform 1 has a slot 4 which extends throughout its length, and the conveyer chain 5 is guided below the slot 4 in channels 6. The chain extends from the end sprocket wheel 7 which is located in the scalding vat 3, along channel 6 to the drive pocket 8 which is located at the delivery end 9 of the platform 1. The chain 5 then returns, suitably supported underneath the platform, back to the end sprocket 7. The sprocket 8 is mounted on the drive shaft 10 which is driven from the motor 11. The drums 12 and 13, journaled in suitable support members 14—14, are located at either side of the slot 4, and project through the platform 1, thus forming a trough with the chain 5 located in the bottom thereof. The drums 12 and 13 are preferably made up in a cage-like structure of square bars 15 spaced around the periphery of circular members, such as 15'—15'.

The drums 12 and 13 are rotated in the same direction by the worms 16 and 17 on the transverse shaft 18 engaging worm gears 19 and 20 on the drum shafts 21 and 22 respectively. The shaft 18 is driven from the shaft 10 by means of a chain 23. Shields 24—24 are fastened to the platform 1 at the ends of the drums 12 and 13 and serve as guiding members.

The guard member or cover 25 is made up in sections 25$^A$ which extend over both drums 12 and 13 and are hinged at one side to the platform, and the other sides are connected to suitable counter-weights 26, so as to be self-adjustable and easily raised or lowered. The hinging is conveniently accomplished by the flexible spraying hose members 27, which are attached to guard sections 25$^A$, and lead out from the water manifold 28 which runs along at one side of the platform 1. The ends of the hose members 27 are inserted through the guard plates 25$^A$. Water under pressure is supplied to 28 from a pump 29 and is sprayed over the hogs as they pass through the machine.

The flexible scrapers or beaters 30 are usually made of strips of rubber belting faced with pieces of steel. The scrapers are attached to the shafts 31 which are supported on the upper surface of the guard plates 25$^A$, and they operate through slots 29 therein. The shafts 31 are mounted in frames 32 which are pivoted at one end on the drive shaft 33 and provided with lugs 34 at the other end for resting on the surface of the plates 25$^A$. The scraper shafts 31 are driven by the chains 35 from the shaft 33 and, by the raising or lowering of the guard sections 25$^A$, the scrapers 30 are maintained in a substantially uniform relation with the surfaces of the different sized hogs. As shown, any section of the guard sections 25 may be independently raised to remove a hog at any point along the machine.

The hogs are connected to the chain 5 by the member 36, to which is swiveled the jaw hook chain 37. The member 36 has forwardly, upwardly inclined surfaces 38 which may be engaged by the beveled member 39 which is attached to the platform at the delivery end 9. When the surfaces 38 ride up on the beveled member 39, the member 36 is raised on the platform and the lug 37 is withdrawn from the chain 5 and thereby disconnected.

In operation the hogs are soaked and scalded in the vat 3 to effectively loosen the hair. The hogs are then attached to the conveyer chain 5 and drawn up on the platform and through the machine, and then automatically disconnected by the member 39. They are guided up over the ends of the drums 12 and 13 by the guards 24 and are dragged along in the trough, which is formed by the drums, and slowly rotated as they move along to subject all surfaces to the action of the beaters 30.

Since the cover members 25$^A$ are adjustably hinged, thereby maintaining the beaters in uniform relation, the hair is effectively removed without injury to the pork. The hair, when removed, is washed away through the openings between the bars 15 and carried off by suitable conveyers. The machine is easily operated, requires less power, and is capable of a high rate of output with uniform and thorough results. And as has been pointed out, the cover sections 25$^A$ may be lifted at any point along the line of travel and a hog removed laterally from the machine which greatly facilitates keeping the machine in operation. Also the machine is self-adjusting for both large and small sized animals.

Although but one specific embodiment of this invention has been herein shown and described, it will be understood that numerous details of the construction shown may be altered or omitted without departing from the spirit of this invention as defined by the following claims.

I claim:

1. A hog scraping machine comprising a horizontally disposed platform, a pair of horizontally disposed drums extending along said platform at each side thereof, said platform having a longitudinally extending slot at the center thereof between said drums, a chain conveyer extending along said slot to which hogs may be attached for the purpose of being drawn through the machine between said drums, a curved guard extending over both of said drums and spaced therefrom, said guard being mounted to rock around a horizontal axis at one side thereof, said guard being provided with a plurality of transverse slots, scraper elements mounted on a horizontal axis above said guard and in position to extend through said slots upon rotation of said scraper elements, and means for rotating said drums and said scraper elements.

2. A hog scraping machine comprising a horizontally disposed platform, a pair of horizontally disposed drums extending along said platform at each side thereof, said platform having a longitudinally extending slot at the center thereof between said drums, a chain conveyer extending along said slot to which hogs may be attached for the purpose of being drawn through the machine between said drums, a curved guard extending over both of said drums and spaced therefrom, said guard being mounted to rock around a horizontal axis at one side thereof, said guard being provided with a plurality of transverse slots, scraper elements mounted on a horizontal axis above said guard and in position to extend through said slots upon rotation of said scraper elements, and means for rotating the drums in the same direction and for rotating said scraper elements oppositely to said drums.

3. A hog scraping machine comprising a horizontally disposed platform, a pair of horizontally disposed drums extending along said platform at each side thereof, said platform having a longitudinally extending slot at the center thereof between said drums, a chain conveyer extending along said slot to which hogs may be attached for the purpose of being drawn through the machine between said drums, a curved guard extending over both of said drums and spaced therefrom, said guard being mounted to rock around a horizontal axis at one side thereof, said guard being provided with a plurality of transverse slots, scraper elements mounted on a horizontal axis above said guard and in position to extend through said slots upon rotation of said scraper elements, said scraper elements being supported at the free ends of arms, the opposite ends of said arms being supported in bearings at one side of the machine, and means for rotating said drums and said scraper elements.

4. A hog scraping machine comprising a horizontally disposed platform, a pair of horizontally disposed drums extending along said platform at each side thereof, said platform having a longitudinally extending slot at the center thereof between said drums, a chain conveyer extending along said slot to which hogs may be attached for the purpose of being drawn through the machine between said drums, a curved guard extending over both of said drums and spaced therefrom, said guard being mounted to rock around a horizontal axis at one side thereof, said guard being provided with a plurality of transverse slots, scraper elements mounted on a horizontal axis above said guard and in position to extend through said slots upon rotation of said scraper elements, means for rotating said drums and said scraper elements, and a tank near one end of said platform, said platform being inclined downwardly at this end into said tank.

5. In combination in a hog scraping machine, a horizontal platform having a slot, a conveyer chain having openings and which chain is guided below said slot, connecting means having a lug adapted to pass through the slot and engage in openings in said chain and having an inclined surface, a beveled member on the platform adapted to cooperate with said inclined surface to raise said connecting means out of engagement with the chain.

6. In combination in a hog scraping machine, a horizontal platform having a longitudinally extending slot, a conveyer chain guided below said slot, connecting means by which hogs may be attached to said chain, rotating supports in the platform on either side of the slot, cover members over the supports and the slot which are adjustable to raised or lowered positions, and scrapers supported on said cover members and operative therethrough.

Signed at Chicago this 12th day of September, 1925.

HERMAN MASCHMEYER.